Nov. 17, 1925.  
T. ELLIOTT  
RAILWAY CAR TRUCK  
Filed March 24, 1922    3 Sheets-Sheet 1
1,562,315
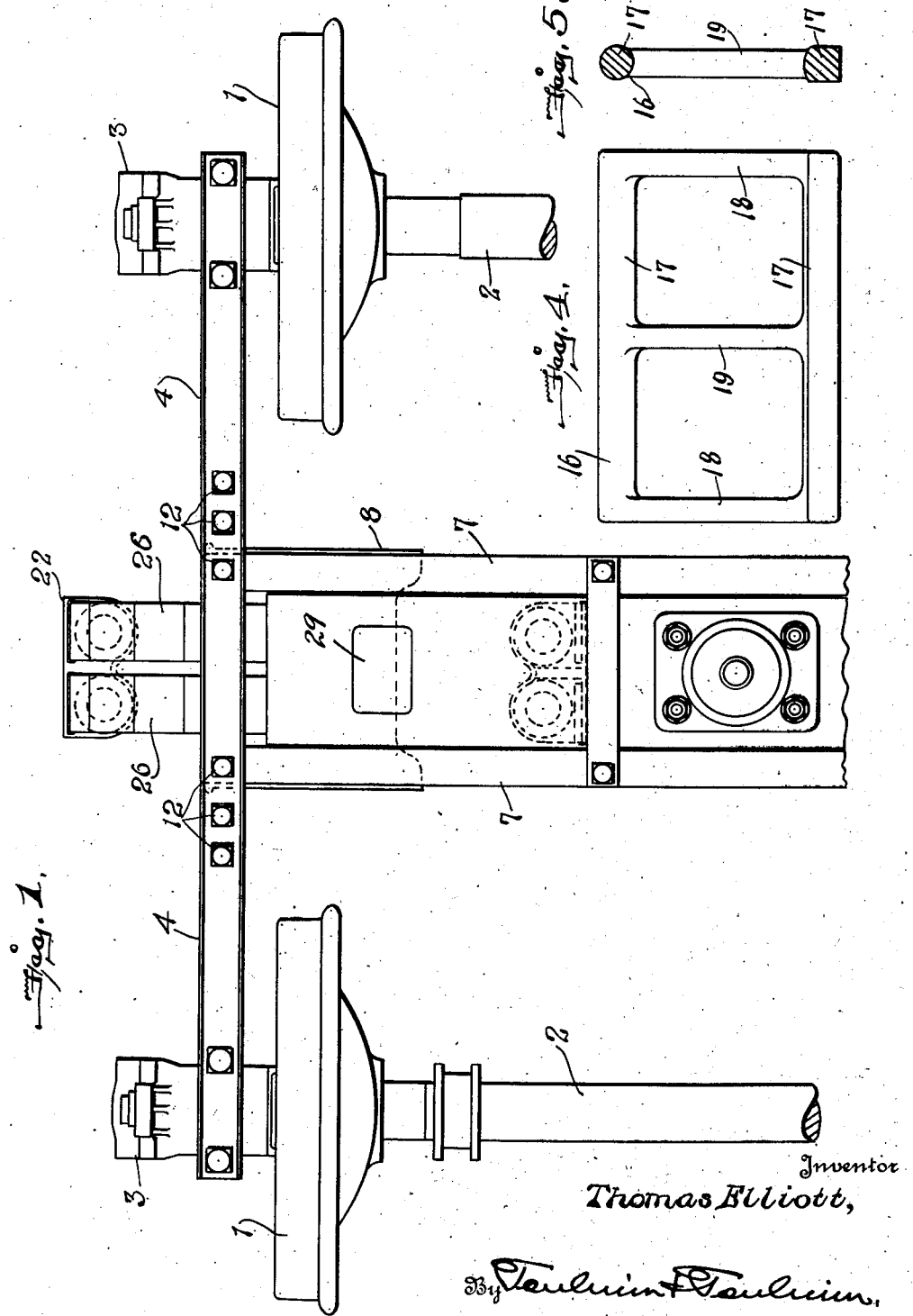
Inventor  
Thomas Elliott,  
By  
Attorneys Nov. 17, 1925.  
T. ELLIOTT  
RAILWAY CAR TRUCK  
Filed March 24, 1922  
1,562,315  
3 Sheets-Sheet 2
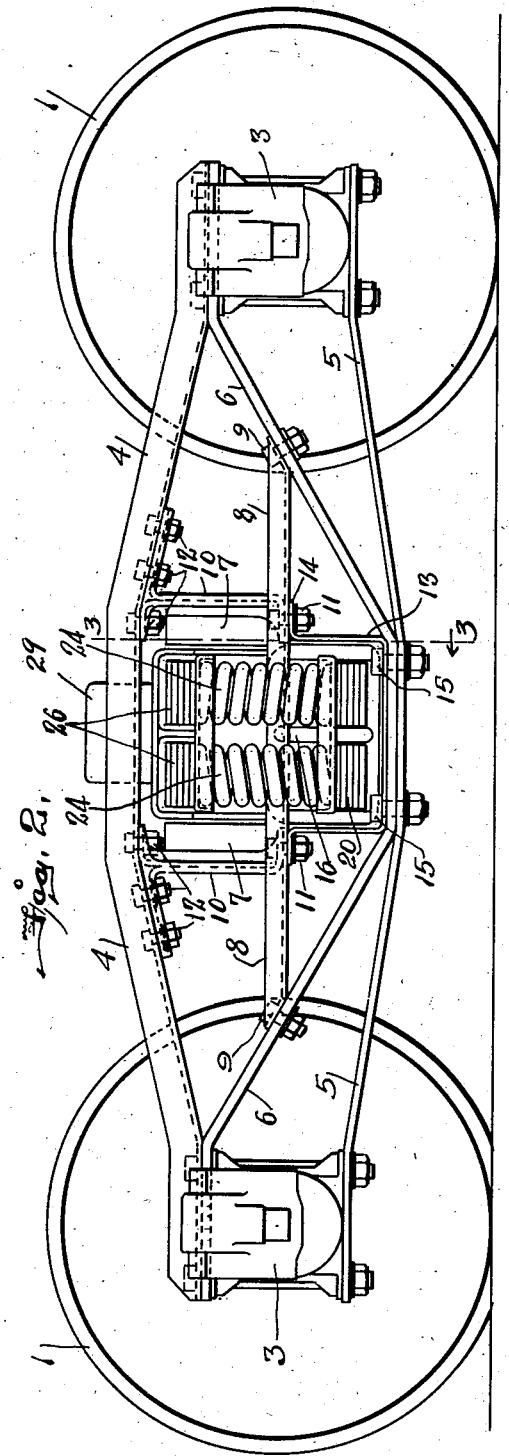
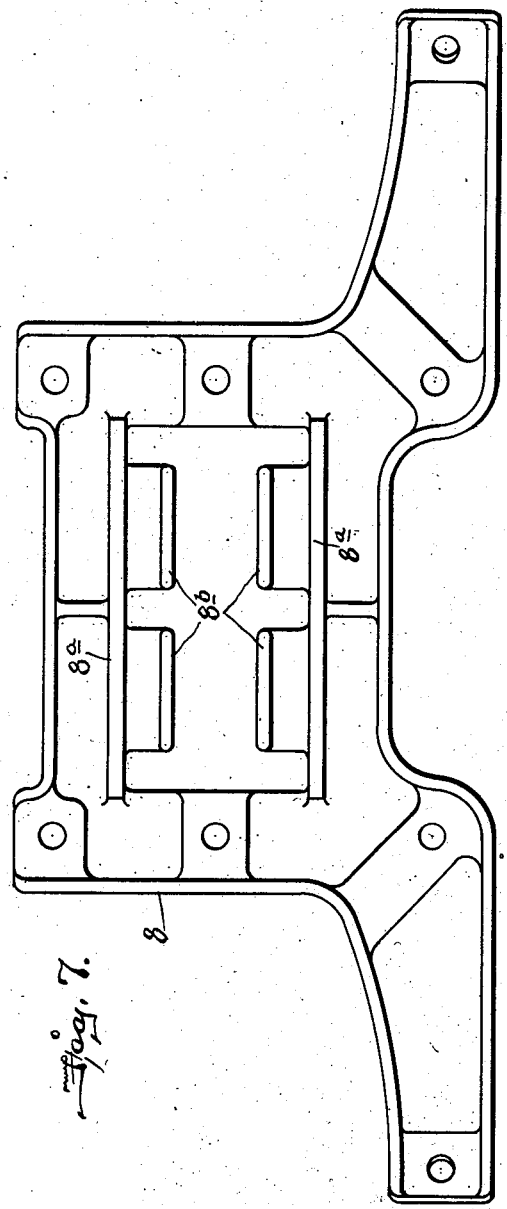
Inventor  
Thomas Elliott,  
By Toulmin & Toulmin,  
Attorneys

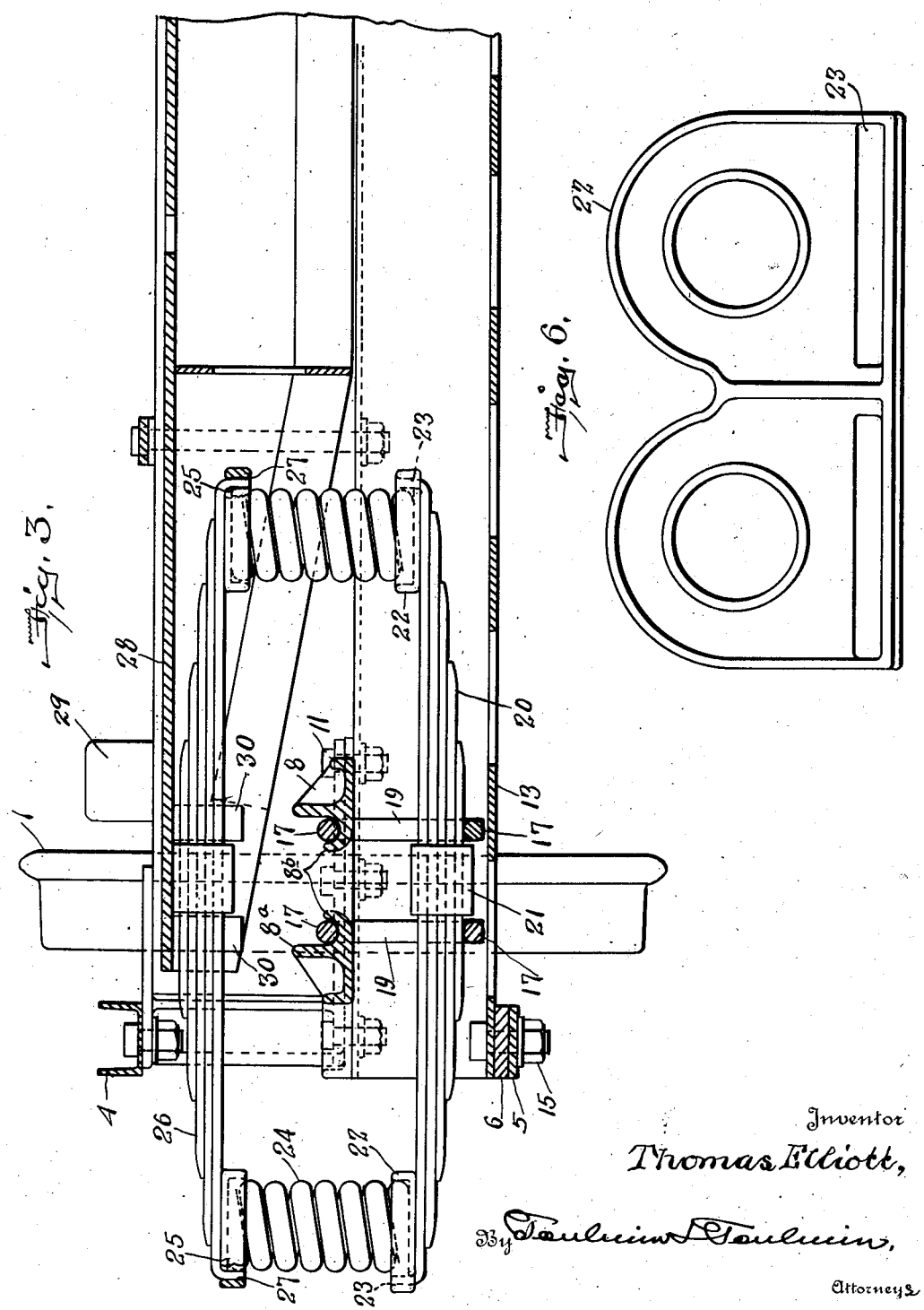

Patented Nov. 17, 1925.

1,562,315

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

RAILWAY-CAR TRUCK.

Application filed March 24, 1922. Serial No. 546,338.

*To all whom it may concern:*

Be it known that I, THOMAS ELLIOTT, a citizen of the United States, residing at Cincinnati, in the county of Hamilton and State of Ohio, have invented certain new and useful Improvements in Railway-Car Trucks, of which the following is a specification, reference being had therein to the accompanying drawing.

This invention relates to improvements in railway car trucks, particularly trucks for use with city and interurban electric car lines.

The major purpose of the invention is to prevent violent lateral jerks of the car body when the wheels strike curves. This is accomplished by the use of suspension links which are hung from the truck frame and support the spring equipment, so that when the truck frame suffers violent lateral jerk or thrust, as on entering curves, these links swing and prevent transferring directly to the bolster, which carries the car body, such jerks or thrusts. When the links swing they draw laterally on the lower leaf springs of the spring equipment which, in turn, draw laterally on the coiled or helical springs in such equipment, which latter springs also resist lateral pulls or pressure, although they yield somewhat to them, and thus ultimately reduce the lateral jerks or pulls by the time they reach the upper leaf springs of the spring equipment. In this way violent lateral jerks and pulls are ironed out or nearly reduced before they reach the bolster on which the car body rests.

The next principal object of my invention is to so absorb the jars and shocks incident to the travel of the truck wheels over the tracks that only minor jars or shocks reach the car body. This I accomplish by a pair of half elliptical springs combined with coil or helical springs which interconnect the ends of the respective half elliptical springs, whereby the shocks are first received by the lower leaf spring which, through its slow vibrations, are partially reduced, thence transmitted to the helical springs which, through their rapid vibrations, absorb the remainder of the shocks except in the case of excessively severe shocks, that which remains of them being transferred to the upper leaf spring which, by its slow vibration, so reduces or irons out such remainder as to leave but a small ultimate jar to be suffered by the bolster and the superimposed car body.

In the accompanying drawings:

Fig. 1 is a plan view of one half or portion of a car truck embodying my invention;

Fig. 2 is a side elevation of the same;

Fig. 3 is a partial elevation and transverse section on the line 3—3 of Fig. 2;

Fig. 4 is a detail side elevation of one of the swinging links;

Fig. 5 is a vertical sectional view of the same;

Fig. 6 is a detail plan view of the seats for the helical springs; and

Fig. 7 is a detail plan view of the link support.

The numeral 1 designates the usual car wheels used on city railway and interurban cars with axles 2 mounted in journal boxes 3 of any conventional kind. And except as modified as hereinafter stated the usual truck frame is mounted on the axle journals through the intermediary of the journal boxes. This frame comprises two side members each consisting of the top arch bar 4, the lower arch bar 5 and the intermediate arch bar 6 and cross beams or transoms 7.

Mounted within each side frame is a link support 8, preferably a casting of iron or steel, in the nature of a bridge which rests upon the intermediate arch bar 6 and is secured thereto by nuts and bolts 9. This support is further connected to the frame support by hangers 10 secured to the support by nuts and bolts 11 and to the top arch bar 4 by a series of nuts and bolts 12. In this way the link support is strongly and rigidly united with the side frame structure of the truck. While I have shown but one side of the truck and one set of these features it is to be understood that both sides of the truck are alike and that these features are embodied in each side.

Secured to each link support 8 and the hangers 10 is a transverse cross pan 13 which forms in addition to the transom 7 a cross connection from one side frame to the other. This cross pan is secured at its upper edges, as seen at 14, by the same nuts and bolts 11 which are used to connect the hangers 10 with the link support 8. And the bottom of the cross pan rests on the intermediate arch bar 6 and is secured to it by the nuts and bolts 15 which also perform the further office of clamping together the lower arch bar 5 and this intermediate arch bar 6, as clearly shown in Fig. 2.

From Fig. 3, in which the link support 8 is shown in vertical cross section on the line 3—3 of Fig. 2, it will be seen that the support has webs 8ª to strengthen it and which with lugs 8ᵇ form bearings for the swinging links 16. This link is shown in detail in Figs. 4 and 5 from which it will be seen that it comprises upper and lower bars 17, end bars 18 and an intermediate bar 19, preferably integral. Of course, it is to be understood that there is such a link support and such links at each side of the truck frame because there are two sets of half elliptical and helical springs in a truck, one set at one side, as shown more particularly in Fig. 1, and another set at the other side, which being a duplicate is not illustrated.

From Fig. 3 it will be now seen that two swinging links are employed to sustain the lower leaf springs 20, the leaves of each of which are held together by the usual U-shaped spring bands 21. Each leaf spring 20 is in effect half of an elliptical leaf spring. At their ends they support spring seats 22, which seats are shown in detail in Fig. 6. The upper leaf of each spring preferably extends through a slot 23, as shown in Figs. 3 and 6, so as to retain the seat from displacement. Each seat accommodates two coil or helical springs 24 and fitted to the upper ends of these helical springs are like seats 25 upon which rest the two upper leaf springs 26 whose lower leaf extends through the seat 25, as shown at 27 in Fig. 3, to retain these seats in place.

It will now be seen that the spring equipment at each side of the truck comprises the four leaf springs, each being in the nature of half elliptical springs, and that the upper and lower springs are interconnected by the intermediate pair of coil or helical springs, one such helical spring operating between an upper and lower leaf spring at each end thereof.

As this spring equipment is sustained by the wheels, axles and truck frame, the car body and its weight are, in turn, supported by these springs through the intermediary of the bolster 28 with its side bearings 29. Each end of the bolster, which runs from one side frame of the truck to the other, rests on the spring bands 21 of the upper leaf springs 26 and is prevented from shifting on such spring 26 by the U-shaped plates 30 which, as seen in Fig. 3, project from the bolster down past the spring 26 and at each side of the spring band 21.

It will now be seen that the weight of the car and its body passes through the bolster 28 and thence to the upper leaf springs 26, the helical springs 24, the lower leaf springs 20, the links 16, the link support 8 and thence to the side frame of the truck and on to the journal boxes and the axles and wheels.

It will further be seen that my spring equipment constitutes in effect two half elliptical leaf springs at each side of the truck with helical springs connecting the ends of the leaf springs, the pressure upon the helical springs being seated firmly in their seats.

It will also be noted that the links 16 are so mounted that they are capable of swinging laterally at their lower ends, a movement in the direction of the length of the lower leaf springs which partake of such swinging movements of the links, but which movements are yieldingly resisted by the helical springs whose natural tendency is to remain upright under the pressure of the weight that they bear.

From this it will be understood that when the wheels and the truck frame receive a violent or severe lateral thrust or jerk, as when the wheels enter upon a curve, particularly a sharp one or when they are so deflected laterally by reason of track imperfections, such jerks or thrusts are imparted to the upper ends of the link 16, but as these links swing on their support their lower ends drag and do not move laterally to the extent of their upper ends. This reduced movement of the lower ends of the links is, therefore, the only lateral movement imparted to the lower leaf springs 20. Their limited lateral movement is yieldingly resisted by the helical springs 24, as stated above. The consequence is that the upper ends of the helical springs travel laterally still less and therefore impart to the upper leaf springs but a small, if any, portion of the lateral movement of the links.

In this manner the lateral jerks or thrusts of the wheels and truck proper are either wholly or largely, according to their degree of violence, absorbed, eliminated or ironed out before reaching the car body through its connection by the bolster with the upper leaf springs. I have thus accomplished an important practical result and have overcome a long standing and menacing evil in the operation of railway cars, the bodies of which have heretofore been constantly subjected to strains, to possible breakage and to disagreeable and sometimes dangerous side jerks and thrusts.

Referring to the other object of my invention I will now describe how my spring equipment absorbs and irons out the vertical jolts and shocks suffered by the wheels and truck frame generally because of irregularities in the rail surfaces. The shocks after passing through the wheels, axles and truck frame are first met by the lower partially elliptical leaf springs. What may be called small or minor shocks are partially absorbed by such leaf springs, that portion thereof not absorbed being transferred to the helical springs which because of their law of rapid vibration take up and eliminate the moderate shock waves received from the slow vibrating leaf springs. Slow vibration of the leaf springs with the rapid vibrations of the helical springs cause numerous vibrations in the helical springs to each vibration in the leaf spring and a non-synchronism of these vibrations of the respective springs, with the result that the moderate shocks practically go no further than the helical springs. Then as to the violent shocks these same effects operate to reduce them, though not to eliminate them, so that they pass from the helical springs into the upper leaf springs, but in modified condition, and by the latter springs are either wholly absorbed and eliminated or so nearly so as to reach the body of the bolster and the body of the car so far reduced as to materially soften the riding qualities of the car and reduce to a minimum the discomforts that arise from shocks.

There is also a co-action between the shock absorbing qualities of the springs, as just described, and the capacity of the links to swing, the lower leaf springs to travel somewhat laterally and the helical springs to flex or bend out of the vertical and take up or reduce these lateral movements. The shock effects when accompanied, and they usually are, with these swinging motions are reduced by the latter by a sort of modification of the vertical shocks by the lateral swinging motion and a like modification of the swinging motion by the vertical vibrations.

Having thus fully described my invention, what I claim as new and desire to secure by Letters Patent, is:—

1. In a car truck, the combination with the wheels, axles and side frames proper, of inwardly extending spring supports secured to said side frames and having inwardly spaced bearings thereon, laterally swinging links mounted on each bearing, a pair of leaf springs at each side frame sustained by the distal ends of said links, a pair of helical springs mounted on the ends of said leaf springs, a pair of leaf springs at each side frame supported upon said helical springs, and a bolster having its ends mounted on the latter leaf springs.

2. In a car truck, the combination with wheels, their axles and side frames proper, of an inwardly extending spring support secured to each side frame and having inwardly spaced bearings thereon, laterally swinging links mounted on each bearing, said links being substantially rectangular, a pair of lower leaf springs sustained by said links, helical springs supported by said pair of leaf springs at the ends of the latter, a pair of upper leaf springs adjacent each side frame with their ends supported by said pairs of helical springs, and a bolster mounted upon the middle portion of the upper pair of leaf springs, and a spacing and reinforcing bar on each link and extending vertically between the leaf springs.

3. In a car truck, the combination with the side frame thereof, of a spring support secured to such frame, hangers also connecting said support to said side frame, a leaf spring supported near its middle by said support, a helical spring mounted one on each end of said leaf spring, another leaf spring having its ends supported upon said helical springs, and a bolster having its end mounted near the center of said said last-mentioned leaf spring.

4. In a car truck, the combination with wheels, axles and opposite side frames proper, of supports secured one to each side frame, laterally swinging links mounted in pairs on each support, spaced one behind the other relative to their direction of movement, a pair of leaf springs mounted on each pair of links at their free ends, a helical spring mounted on each end of each of these leaf springs, a pair of other leaf springs at each side frame, each end of which is mounted on one of said helical springs, and a bolster whose ends are supported near the center of said last-named leaf springs.

5. In a car truck, the combination of a side frame proper and a spring support carried by said side frame, and having inwardly extending portions having inwardly spaced bearings thereon, laterally swinging links mounted on each bearing, a leaf spring mounted on said links, and a bolster sustained by said leaf spring.

6. In a car truck, the combination with a side frame proper, of a spring support secured to said frame, hangers also connecting such support to such frame, links hung on such support, a leaf spring sustained by such links, a helical spring mounted on each end of such leaf spring and another leaf spring whose ends are mounted on said helical springs.

7. In a car truck, the combination with a side frame thereof, of a spring support secured to said frame, hangers also connecting the support with the frame, a pair of links swung on said support, a pair of leaf springs mounted on the free ends of the links, helical springs mounted one on each end of such leaf springs, a second pair of leaf springs whose ends are mounted on said helical springs, and a bolster whose end is supported by the last-named pair of leaf springs.

In testimony whereof, I affix my signature.

THOMAS ELLIOTT.